3,185,654
COMPOSITION CONTAINING RESOLE AND LIGNIN IN FREE ACID FORM AND PROCESS FOR PREPARING SAME
Frank J. Ball and Joseph B. Doughty, Charleston, and William G. Vardell, Summerville, S.C., assignors to West Virginia Pulp and Paper Company, New York, N.Y., a corporation of Delaware
No Drawing. Filed Dec. 8, 1958, Ser. No. 778,632
10 Claims. (Cl. 260—17.5)

This invention relates to resins and relates more particularly to synthetic resins produced by chemical reaction between molecularly less complex substances, and to compositions and methods used in the manufacture of such resins.

This invention is concerned more especially with the production of synthetic resins of the character aforesaid which contain lignin recovered from natural ligno-cellulose material, the lignin having entered into chemical reaction with the other resin-forming substances; and with improvements whereby lignin may be utilized together with alkaline catalyzed phenol-aldehyde resins and resin-forming compositions. In practicing this invention one may obtain resins and resin-containing products having properties which are the equivalent of or even superior to those of commercial phenol-aldehyde resins; and the improvements afforded by this invention relate to methods, resin products and resin intermediates whereby resins are afforded by chemical interaction with the lignin so that a high order of properties may be obtained with economies both as regards processing and the cost of basic ingredients. The lignin, therefore, does not function merely as a cheap diluent or adulterant, but has been made available as a low cost ingredient for high quality resins and resin-containing products suitable for many commercial applications. For example, in the practice of this invention resin-bonded laminates have been produced having even better strength characteristics than have been obtainable heretofore when using commercial phenol-aldehyde resins produced for this purpose, and properties have been obtained which represent up to a 40% improvement in flexural strength as compared with the best grades of commercial phenolics and which are comparable with those obtainable by employing much more expensive resins such as the epoxy resins. Likewise the moisture resistance of laminates has been increased to the extent of 60% or more.

In obtaining free cellulose fiber from natural ligno-cellulose material, the ligno-cellulose material ordinarily is subjected to treatment whereby the lignin is solubilized sufficiently to permit the formation of an aqueous slurry from which the fibers may be separated. The dissolved lignin, which is in the neighborhood of 25% by weight of the natural ligno-cellulose, is contained in the solution from which the fibers are separated and finds such limited commercial application that almost all lignin solutions are either sewered or disposed of by partial evaporation of the water content and spraying the resulting concentrate into a furnace wherein the lignin is burned and from which the inorganic treating chemicals used in the pulping operation may be at least partially recovered. When lignin is recovered from a pulping operation in dry condition it generally is in the form of an amorphous brown powder and may be purchased from producers at a cost of only a few cents per pound.

The limited commercial utilization of lignin is occasioned principally by reason of its physical and chemical characteristics. Thus lignin is not resistant to water and is soluble in alkaline solutions. Moreover, it is a non-thermosetting thermoplastic which tends to disintegrate if heated above about 200° C. and which, if formable at all from the amorphous powdered condition as recovered, merely provides a crumbly mass having little or no strength.

Lignin as it occurs in natural ligno-cellulose material is a complex substance in the nature of a non-uniform polymeric structure in which the basic molecular configuration is believed to be derived from coniferyl-type alcohols with the creation of repeating propyl-phenol units. The exact structure of lignin, however, is uncertain. A vast amount of research work has been carried out to determine the structure of lignin, but to date no structure has yet been set forth which satisfactorily explains all the chemical and physical characteristics of lignin. The presence of ether linkages within the structure and the presence of benzene rings, methoxyl groups, and both alcoholic and phenolic hydroxyls has, however, been well established. From our work it appears that a carboxyl group is also present in the lignin molecule, although the presence of this carboxyl group has not been generally established. The presence of a carboxyl group for approximately each 1,000 molecular weight of lignin greatly aids in explaining the phenomena which occur when lignin is utilized in conjunction with alkaline catalyzed phenol-aldehyde compositions and reaction products in the practice of this invention.

Lignin as it occurs in nature is generally termed "proto-lignin" and varies somewhat depending upon the particular source of the ligno-cellulose material. The principal variation in lignin, depending on its source, appears to be the number of methoxy groups present in the molecule. Thus it has been estimated that hardwood lignin contains about 20% to 21% by weight of methoxy groups, that lignin from soft woods contains about 14% to 15% by weight of methoxy groups, and that lignin from grasses contains only about 0 to 1% by weight of methoxy groups. However, the methoxy groups contained in lignin are substantially non-reactive and such differences in the content of methoxy groups are not regarded as having substantial importance in connection with the practice of the present invention.

When the proto-lignin content in naturally occurring ligno-cellulose material is separated from the cellulose fiber and later is recovered, the naturally occurring proto-lignin is affected by the recovery process, with the result that the lignin which ordinarily is referred to in the art is the lignin in its form as recovered, as distinguished from the proto-lignin occurring in the natural ligno-cellulose material. In the practice of this invention it is the recovered lignin which is employed and which is referred to herein. Due to the greater complexity of the naturally occurring proto-lignin it does not lend itself for use according to the present invention.

In addition to the foregoing, it is also essential in the practice of this invention to employ the lignin which is or is chemically similar to that produced as a by-product of alkaline pumping using either the soda process, wherein the pulping liquor contains sodium hydroxide, or the sulfate process, wherein the pulping liquor contains both sodium hydroxide and sodium sulfide. Such lignin is generally referred to in the art as "alkali lignin" and is to be distinguished from sulfite lignin, which is the by-product of pulping natural ligno-cellulose material with bisulfite and sulfur dioxide and which occurs in the form of a ligno-sulfonic acid in the sulfite waste liquor and can be precipitated by means of alkaline earth salts in effecting its recovery in the form of salt. Such ligno-sulfonic compounds do not possess the attributes required for use according to this invention, but this does not necessarily preclude the possibility of chemically treating sulfite lignin, so as to reduce the inorganic material and convert the lignin to a form having utility according to the present invention.

It is a further feature and essential attribute of this invention that the alkali lignin which is employed be in the free acid form. During the pulping process, whereby the fibers are released from the natural ligno-cellulose, the lignin becomes dissolved in the pulping liquor as a salt of lignin, and is conventionally recovered from the pulping liquor by acid precipitation after the pulping liquor has been separated from the fibers. The lignin can be recovered from such acid precipitation as free lignin or as a lignin salt, depending upon the specific conditions under which the lignin is obtained. If the lignin is precipitated at a high pH of the order of about 9.5 to 10.0, the salt of lignin is obtained. On the other hand, if the lignin is precipitated at a low pH of the order of about 2.0 to 5.0, or if the lignin precipitated at a high pH is acid washed so as to substantially free the lignin from its salt, free lignin is obtained. Moreover, lignin of slightly different characteristics can be obtained dependent upon the pH at which the lignin is precipitated from the pulping liquor. Thus a pulping liquor with a pH of 12.5 can be treated with acid to impart a pH of 10.0 whereby a fraction of the lignin content of the pulping liquor will be precipitated. But if the lignin thus precipitated is removed and the pulping liquor is further acidified to a pH of, say, 9.0, another fraction will be precipitated. This process can be continued until all the lignin has been precipitated at a very low pH. The different fractions of lignin thus precipitated when in or converted to the free lignin form possess slightly different characteristics, such as solubilities due, it is believed, to lignin having slightly different molecular weights having been precipitated at the different pH levels.

In the practice of this invention all these fractions of lignin are usable so long as the lignin is in a free acid form, which likewise is referred to herein as free lignin.

Heretofore attempts have been made to apply lignin in one form or another in combination with resinous materials of the phenol-aldehyde type, the principal motive being the utilization of a very low cost material to extend phenol-aldehyde resins prepared from more costly raw materials without excessively detracting from the properties and utility of the phenol-aldehyde resin as such. However, due to processing difficulties encountered as well as adverse effects upon the properties as compared with the properties of the phenol-aldehyde resin without the lignin, there has been little or no commercial use of lignin in conjunction with phenol-aldehyde or other types of resins. According to this invention, not only can lignin be employed in relatively large proportion with phenol-aldehyde type resins, thereby greatly reducing the cost, but also the properties of these lower cost resins can be produced so as to be superior to the properties of the best phenol-aldehyde resins which are available commercially. These excellent properties can be obtained not only with the better grade of resins but also can be obtained utilizing phenol-aldehyde resins which when cured by themselves have relatively poor properties and which are generally lower in cost, thereby enabling even further savings to be realized.

As aforesaid, this invention is concerned with the utilization of lignin with alkaline catalyzed phenol-aldehyde resins as distinguished from acid catalyzed resins produced by reaction between the phenol and formaldehyde.

The type of reactions between formaldehyde and a phenol by way of condensation and/or polymerization is substantially different depending upon whether these reactions are effected in the presence of an alkaline catalyst or in the presence of an acid catalyst. When an alkaline catalyst is employed, the initial reaction consists primarily in the production of methylol substituents on the benzene ring of the phenol and the reaction product initially produced is soluble in water or in certain organic solvents such as methanol or ethanol, with or without the presence of some water. The reaction product in this condition is referred to as "A stage resin" and such alkaline catalyzed products are generally referred to as "resoles." The A stage resole likewise is soluble in alkaline solutions and generally is initially used while in this stage. Further reaction results in polymerization of the methylol phenols to form a product that is insoluble in alkaline solutions, and the reaction product in this condition is commonly referred to as being in the "B stage." Further polymerization at elevated temperatures results in the conversion of the B stage resin into the thermoset condition in which it normally occurs in manufactured products, this condition being generally referred to as the "C stage." The different stages of reaction are effected without the addition of a curing agent. Alkaline catalysts commonly used for catalyzing phenol formaldehyde reaction are the oxides and hydroxides of alkaline earths and alkali metals, ammonia, and amines such as ethanolamine.

As distinguished from the resoles produced by alkaline catalyzed reaction between formaldehyde and a phenol, the presence of an acid catalyst results in a different reaction mechanism, resulting in more highly polymerized reaction products which are commonly referred to in the art as "novolaks." Such novolaks do not possess the solubility of the resoles, and are generally utilized by effecting a cure in the presence of a substantial quantity of a curing agent, such as hexamethylene tetramine.

A principal feature of this invention resides in the fact that a resole in the A stage dissolves and also promotes the dissolution of free lignin. Further features of this invention relate to the improvements which result in the employment of free lignin as compared with lignin which is recovered from alkaline pulping liquor in the form of an alkali metal salt.

Free lignin in the free acid form, as distinguished from the alkali metal salt of lignin, has the capacity of reacting with alkali metal, alkaline earth metal or other alkaline reactive cation of the alkaline catalyst that remains in the A stage resole either in combination with the methylol phenol reaction product or with any phenol that may remain unreacted, for effecting a reaction in the nature of ion exchange and acidification based on acidic functions of the lignin whereby the resole is modified for the production of cured resin products having improved properties.

The acidic function of the lignin, which is primarily effective in modifying an A stage resole in the respects mentioned, is believed to be a carboxyl function, and the improved properties of the cured resin are believed to be due to the fact that free lignin modifies the A stage resole so as to promote the production of either linkages between the phenol residues to produce dibenzyl ether-type radicals rather than the methylene bridge linkages of the phenyl methane-type ordinarily produced upon curing a resole.

It likewise is believed that the high order of properties which is obtainable in the practice of this invention may be occasioned by the fact that the free lignin so reacts with and holds the alkaline catalyst for the resole that the polymerization of the phenol occurs with development of linkages by a mechanism substantially different as compared with the mechanism in the absence of the free lignin, in that reactions are promoted with development of linkages at the 2 and 2′ positions on the phenol molecule. Such a reaction mechanism provides upon curing a much more uniformly linear structure imparting enhanced propreties as compared with those imparted by a more highly branched structure resulting from a greater proportion of the reaction occurring at the 2 and 4 positions on the phenol molecule.

Moreover, under the conditions wherein the alkaline catalyst is partly or substantially completely removed by reaction with the added free lignin, more favorable conditions are believed to be provided for the resin-forming chemical reaction between the methylol groups of the A stage resole and the alcoholic groups of the lignin rather than the hydrogen atoms on the benzene rings of the lignin molecule; and when the reaction of the methylol groups is thus promoted with the alcoholic groups of the lignin, the chemical bonds or linkages that are formed occur at much greater spacing. Such wider spacing of the bonds likewise is believed to contribute to the superior properties, particularly strength characteristics, of cured resins produced according to this invention.

The effect of the addition of free lignin also appears to be beneficial even though the free lignin may be added to a resole containing such a relatively large proportion of an alkaline catalyst that the free lignin addition does not lower the pH to a value less than 7, especially in the case of ammonia catalyzed resoles, as will be referred to in greater detail hereinbelow. For adhesive applications, desired viscosity characteristics are commonly afforded by the expedient of utilizing a resole so highly advanced as to require a relatively large proportion of alkali to hold it in solution, and in such case the addition of free lignin is beneficial even though the amount of alkaline catalyst is so great that the added free lignin does not lower the pH of the resole to a value less than 7. However, it is preferable and constitutes an important feature of this invention to employ a combination of free lignin and an A stage resole in mutual solution such that the alkaline catlayst employed in the production of the resole is taken up by the lignin acid groups instead of remaining with the acidic phenolic groups of the resole. Under such conditions a pH of 7 or less generally results, thus favoring the production of products having enhanced properties.

Likewise, in this connection, it is a feature and advantage of this invention that for adhesive applications as in the production of plywood or flake board, the necessity for going to a relatively highly advanced resole and a high amount of alkali may be eliminated, for by the employment of free lignin the desired viscosity characteristics for minimizing absorption may be obtained when using a less advanced resole containing less alkali. Such less advansed resoles ordinarily are less expensive and likewise react more effectively for obtaining a high order of properties. In addition, disadvantages as regards lessened water-resistance and impaired electrical properties occasioned by the presence of relatively large amount of residual alkaline catalyst may be minimized.

The foregoing is believed to explain, at least in part, the improvements which are obtained by the employment of lignin in its free acid form as distinguished from its occurrence in the form of a salt of an alkali metal. It is not intended that this invention be dependent upon the correctness of theories advanced herein as to the mechanisms of the reaction which takes place, inasmuch as these reactions are of a highly complex nature. However, the theories as to the mechanism of the reaction are advanced herein for the purpose of indicating what appear to be the chemical reasons underlying the improvements which have been obtained according to this invention.

Aside from the foregoing as to the type of reaction which is induced by the presence of the lignin during curing, it also is highly significant that one is enabled, according to this invention, to reduce the amount of salt which, if present, adversely affects water-resistance and electrical properties.

In the practice of this invention it is preferable to employ lignin from which any alkali or other metal has been substantially completely eliminated so as to take full advantage of the lignin in its free acid form. However, to the extent that the content of sodium or any other alkali metal is reduced to less than the molar equivalent for reaction with the lignin, some free lignin will be present. The amount of sodium, expressed as sodium carbonate, for producing the mono sodium salt of lignin is about 5.3% by weight of the lignin, based on a 1,000 molecular weight of lignin. While lignin which has been produced so as to contain a substantial amount of free lignin will provide some of the advantages of this invention, it is preferable that the free lignin which is used be produced as free as possible from contamination with metal salt, and it ordinarily is advantageous that the lignin shall contain less than about 1½% by weight of ash.

It is essential in the practice of this invention that phenol-aldehyde be brought to the A stage prior to bringing in the lignin. It is conventional in the preparation of a resole to commingle a phenol with an aqueous solution of formaldehyde in the molar ratio desired. Such molar ratio usually is in the order of 1.5 moles of formaldehyde per mole of phenol, and for preparing the resole conventional practice is to employ an aqueous formaldehyde solution containing approximately 37% of formaldehyde. About 0.1% to 15% by weight of sodium hydroxide or other alkaline catalyst is added to the composition for promoting the reaction for forming the A stage resole, alkali in the lower portion of the range being employed when good water resistance and electrical properties are desired. If free lignin were to be incorporated in the reaction mixture prior to resole-forming reaction carried to the A stage, then the reactions that take place are highly undesirable for two principal reasons.

In the first place, such reaction as occurs is essentially between the phenol and the formaldehyde inasmuch as the phenol competes more effectively than the lignin for the aldehyde and the lignin does not sufficiently enter into the resin-forming reaction to offset its disadvantageous properties in the unreacted condition.

In the second place, the lignin forms the alkali salt in the presence of the alkaline material used for the catalyst, thus preventing the alkaline material from exerting its catalyzing effect on the reaction and on the formation of the methylol groups necessary for further desired resin-forming reaction. Moreover, if one were to attempt to counteract the aforesaid effect of the lignin on the alkaline catalyst by addition of a further quantity of alkali either before or after the lignin addition, this would result in loading the reaction product with alkali metal salt to such extent as to excessively impair the properties desired in the resin, particularly the water-resistance and electrical properties of the resin. Thus, for example, the amount of NaOH required to neutralize the acidity of lignin is about 4.0% by weight of the lignin. And, of even more fundamental importance is the fact that any such alkali addition would cause the formation of the lignin salt which would be incapable of removing the alkali from the phenolic groups, thus impairing the production of resins having the improved physical properties that are attainable according to this invention, as well as the other improvements hereinabove mentioned.

Another reason for not adding the lignin to the reaction mixture prior to the attainment of the A stage is that the addition of the lignin so affects viscosity as to make it difficult to follow the reaction and block it at the proper time when the desired A stage is reached.

After a resole has been produced in the A stage containing an alkaline catalyst, the presence of the catalyst is such that notwithstanding reduction in temperature to room temperature there is a gradual continuance of the reaction, and since such continuance of the reaction normally is undesirable, it is desirable to block further reaction by neutralization of the alkaline catalyst. However, mineral acid is undesirable for this purpose because mineral acid has the disadvantage of adding to the mineral content of the resole and impairing the water-resistance and electrical properties of the resin produced from the resole. Moreover, the acid radical of the added mineral acid is disadvantageous in that it tends to attack materials with which the resole is used such as cellulose or the coatings on glass fibers. Accordingly, the usual expedient for improving shelf life, if any, has been to drive off water and cut back with an alcohol such as methanol.

It is an advantage and feature of this invention that when a resole has been brought to the A stage by the employment of an alkaline catalyst in the usual manner, further reaction of the resole may be checked and the resole rendered relatively stable as regards polymerization during shipment and storage by the addition of free lignin rather than a mineral acid. In such case free lignin combines with the alkaline catalyst and one is thereby enabled to hinder or inhibit undesired premature polymerization of the resole in solution with the further advantage that a non-volatile organic compound is employed that enters into the ultimate resin-forming reaction. Moreover, in addition to counteracting the continued undesirable catalytic action of the alkaline catalyst after the resole has been brought to the A stage, the presence of the free lignin has the aforesaid property of modifying the resole to such condition that the polymerization of the resole occurs under essentially uncatalyzed condition at a neutral or acid pH, i.e., at a pH usually between about 3.0 and about 7.0, with the production of the improved properties and other advantages. Such a result cannot be obtained by the employment of mineral acids inasmuch as the mineral acid tends to react directly with the methylol groups of the resole and causes precipitation of the resole from solution. Thus, our experimental work has demonstrated that addition of a mineral acid to a conventional solution of A stage resole caused a very substantial amount of the resole to occur in an insoluble form with resultant formation of precipitate inconsistent with commercial use of resole. By the employment of lignin for throwing the resole to a pH between 3.0 and 7.0, the reactive methylol groups are retained and the conditions are favorable for their reaction with the production of ether linkages. It ordinarily is desirable to add at least sufficient free lignin to the resole for reaction with the alkaline-reactive cation of the alkaline catalyst contained in the resole, i.e., at least the molar equivalent of the alkaline-reactive cation of the resole. The presence of the free lignin available for reaction with the alkaline-reactive cation of the catalyst counteracts the tendency of the resole to increase in pH during curing due to liberation of free alkali and serves to hold the resole at the desired pH favorable for curing as curing progresses. A like effect is obtained in the case of an amine catalyst which breaks down during curing with liberation of ammonia or amines.

Moreover, the methylol groups of the resole under such conditions are favorable to the reaction with hydroxyl groups, not only of such phenol as may be present, but also with hydroxyl groups contained in the lignin, so that a resin-forming chemical reaction takes place between the resole and the lignin. This reaction appears to be largely with alcoholic hydroxyls of the lignin which might otherwise adversely affect water-resistance. Moreover, there appears to be esterification of residual lignin carboxyl groups with hydroxyls that further benefits water-resistance. The methylol groups likewise have such reactivity as to be reactive with cellulose hydroxyls.

The inclusion of free lignin serves to lower substantially the pH of the resole to which it is added, and in ordinary practice of the invention the pH of the resole is reduced to the extent of at least about one pH unit in the pH scale. Preferably, the lignin is present in an amount whereby the pH of the resole containing the lignin is established in the range from about 3 to about 6. Within this pH range, and especially between about 3.5 and 5.5, the reaction conditions are especially favorable for the attainment of the improved properties, and for the reaction of free methylol groups comprised in the resole with the hydroxyl groups comprised in the lignin. While it is preferable that the pH of the composition be between about 3 and about 6, nevertheless the incorporation of the lignin with the A stage resole is effective in the respects above mentioned, at pHs between about 6 and about 7 due to the fact that the neutralization of the alkaline catalyst is effected by the organic lignin complex rather than mineral acid and due further to the fact that there is believed to be a substantial ion exchange to the lignin of the alkali-imparting radical of the alkaline catalyst that is favorable to the production of products having improved properties. Thus, our experimental work has indicated that lignin has the peculiar combined properties of counteracting the effect of an alkaline catalyst by what is believed to be a reaction with carboxyl groups comprised in the lignin and the modification of the resole so as to be favorable both to enhanced effectiveness of the polymerization reaction and to promoting the reaction of the methylol groups with the hydroxyl groups of the lignin.

While the resultant composition containing free lignin dissolved therein is adapted for storage at room temperatures, the presence of the lignin serves to promote curing at elevated temperatures with the result that the mildly acidic composition upon application and curing may be cured under conditions that are conventionally employed in curing a resole or at even lower curing temperatures. In this connection, it likewise may be mentioned that the curing of a resole tends to slow down as the formation of the less reactive methylol derivatives are formed and that such slowing down of the curing reaction is minimized rather than otherwise by the presence of the free lignin.

The employment of free lignin to provide an A stage resole in the neutral form is to be contrasted with the employment of an acid catalyst such as a mineral acid for effecting an acid cure of an A stage resole. Usually the resole is cured on the alkaline side or after having been brought to a substantially neutral condition by the addition of a neutralizing agent such as a mineral acid. In such case the reaction during curing results primarily in the formation of methylene bridge linkages. Occasionally, however, a mineral acid curing agent is added to an A stage resole so as to effect a rapid acid cure at a pH less than 3, and under such conditions as well the reaction whereby curing is effected results primarily in the production of methylene linkages. When, on the other hand, the neutralization of the alkaline material used in initially curing the resole is effected by lignin in its free acid form, the free lignin serves both to provide a slightly acidic medum favorable to the formation of ether linkages and to stabilize the resole solution within pH limits which are not feasible in the absence of the lignin and by the employment of a mineral acid.

Another feature and aspect of this invention resides in the discovery that an A stage resole serves as a solvent for and promotes the solubility of free lignin. Thus whereas free lignin has very limited solubility in the volatile solvent medium in which A stage resoles are conventionally prepared and sold, i.e., methanol, ethanol, water and combinations thereof, the presence of the dissolved A stage resole in these solvent media serves to provide enhanced solubility for free lignin, with the result that A stage resoles containing completely dissolved free lignin may be provided for sale and use in the ultimate production of cured resins.

As hereinabove stated, an A stage resole is conventionally prepared by mixing phenol with aqueous formaldehyde, the formaldehyde constituting approximately 37% of the aqueous formaldehyde solution. The amount of formaldehyde may vary from about 1 to 3 moles per mole of phenol, the ratio most commonly used being about 1.5:1. By virtue of the water initially included in the reaction mixture and that which is formed during reaction, an A stage resole as initially produced usually contains approximately 50% solids. When reference is made herein to the solids content of a resole, the reference is to solids content determined by heating the resole at 135° C. for 3 hours. It is to be noted that during this heating curing will occur with the splitting out of water. Solids content as used herein, therefore, denotes the weight of the cured resin obtainable from the resole solution as a percentage of the total weight of the resole solution. If the reaction is in the low advanced stage, then the resole is soluble in water. However, for certain purposes a more advanced A stage resole is desired and in such case the solubility for the more advanced resole usually requires the employment of other solvents such as methanol or ethanol. Moreover, it is general practice to concentrate the solution until the solids content is in the neighborhood of 70%, the concentration of the solution being accomplished by evaporation of the aqueous solvent medium employed during the initial production of the resole. The stripping of the water from the initially produced resole may be accomplished at moderate temperature and preferably is carried out under a vacuum. The composition provided for shipment which contains approximately 70% by weight of solids may utilize a solvent medium which may vary considerably depending on a number of factors. Thus, in addition to the degree of advancement of the resole, the amount of alkali which is present likewise influences solubility, solubility being increased with increased amounts of alkali. Normally it is desirable that the amount of alkali be minimized, but in the case of the more advanced resoles as much as 5 to 15% of alkali is required to provide solubility. Moreover, the type of catalyst employed likewise is a factor in that a resole which has been catalyzed by ammonia is more readily precipitated from water as compared with the use of other alkaline catalysts. The lesser advanced resoles as such have the advantage of greater reactivity as compared with the more advanced resoles, but for many purposes, such as use of a resole in lamination, the resole is required to be carried to sufficient advancement so as to minimize squeeze-out during lamination. Moreover, for other purposes, particularly in connection with adhesives, still further advancement of the resole is required. Accordingly in usual practice an A stage resole utilizes as the solvent medium one which consists principally of methanol or a mixture of ethanol and water, a 60% ethanol 40% water solution generally being used for lamination purposes. These solvent media, which are comparable as regards both cost and solvent power, are consistent with minimum cost for the volatile solvent component. These solvent media per se, as aforesaid, are not capable of accomplishing substantial solution of free lignin. However, because of the presence of the dissolved resole in such solvent media, free lignin in desired proportions relative to the resole may be readily and completely dissolved in solutions to produce solutions having a pH within the ranges hereinabove mentioned. In this connection, free lignin presents a different problem as compared with lignin in its alkaline salt condition for, as is well known, lignin in its alkaline salt form is readily soluble in water.

In the practice of this invention it is not essential that the solvent medium as such for the A stage resole be a solvent for the lignin, this being highly significant commercially in view of the fact that solvents for free lignin such as mixtures of acetone and ethanol (neither acetone alone nor ethanol alone is a solvent which will completely dissolve free lignin) are not suitable for practical commercial operation. Thus the solvent medium that is desirably employed in the practice of this invention is selected from methanol, ethanol, propanols, water, and mixtures thereof with each other. The amount of solvent in the composition may vary from about 25% to about 70% and for shipment it is desirable that the solvent be less than about 50%.

Since the resole evidently modifies the polarity of aqueous solutions sufficiently to dissolve the lignin, it is necessary that enough resole be present in the solution to keep the lignin soluble. Upon dilution of lignin-resole solutions to about 70% solvent the lignin will generally become insoluble. The percentage of solvent present when this occurs, however, may vary considerably either up or down depending on the solvent used, the nature of the resole, and the lignin to resole ratio. Generally at less than 25% solvent in lignin-resole solutions the viscosity becomes so great that it is impractical to further increase the solids content. This also is greatly effected, however, by the same considerations mentioned above in respect to the maximum amount of solvent to be used.

It likewise is the case that according to our discoveries the presence of the lignin enhances the solubility of the resole with the result that the resole is held in solution at pH values below the pH values at which the resole would be soluble in the absence of the lignin. This effect is particularly valuable in holding resoles in solutions in volatile solvent media at pH values of 7 or less.

The preferred method of accomplishing the dissolution of free lignin in the resole solution is that of distributing free lignin in finely divided form as a suspension in the resole solution. The lignin will gradually go into solution, but inasmuch as the addition of relatively large amounts of lignin tends to increase viscosity the dissolution of the lignin in the resole solution may be accelerated by the addition of additional solvent medium such as methanol or a mixture of ethanol and water. For relatively very large lignin additions the foregoing sequence may be repeated, namely, the addition of part of the lignin as a suspension followed by accelerating its dissolution by the addition of a solvent medium, and the balance of the lignin being added by repeating the aforesaid combination of steps one or more times.

Another convenient way for effecting the dissolution of free lignin in a resole solution consists in adding such additional quantity of volatile solvent medium as may be desired in the composition to be produced and then incorporating the lignin. In such case mild heating is sometimes required in order to expedite the solution of the lignin and the lignin remains dissolved upon cooling to room temperature again.

While the addition of lignin tends to increase the viscosity of a resole solution to which the lignin is added, the addition of the free lignin is consistent with the production of compositions having viscosity suitable for intended commercial applications. Thus in the practice of this invention the A stage resole to be combined with the lignin may be selected so as to be in a relatively low state of advancement, the advancement being sometimes substantially lower than that which would be preferable for the intended application of the resole when used by itself. Thus it is an advantage of this invention that by reason of the employment of free lignin, an A stage resole may be employed in its more reactive and more readily cured form while at the same time providing a given desire viscosity. For example, by the employment of free lignin in mutual solution with an A stage resole, the viscosity of the composition may be that best suited for the production of laminates without excessive bleedout during lamination under pressure while at the same time providing a resole in such condition of advancement and reactivity both with itself and with the free lignin as to permit a rapid cure. The effect on viscosity obtained by the addition of free lignin may be varied to a certain extent by the particular free lignin that is employed. Thus, as hereinabove stated, alkali lignin fractions are precipitated from the black liquor at different pH values and those fractions precipitated at higher pH values have a somewhat higher molecular weight and impart greater viscosity when incorporated in a resole solution. Oxidation of lignin upon standing also increases its viscosity-imparting properties somewhat.

For certain other purposes it is a further advantage of this invention that free lignin may be employed to produce enhanced viscosity without impairing the reactivity of the resole. Thus in the case of a conventional resole increase viscosity may be accomplished only by further advancement of the resole short of the B stage. However, such advancement of the resole to attain enhanced viscosity results in such reduced solubility as to require additional alkali for the purpose of holding the resole in solution. The additional quantity of alkali is undesirable because of its adverse effects on properties such as water-resistance and electrical properties. Accordingly, it is a unique advantage of this invention that enhance viscosity may be attained by the employment of lignin while retaining such solubility as not to require the addition of alkali to hold the solids in solution. The proportion of solids which may be held in solution is of utility for purposes such as the production of flake boards wherein the resin to serve as a binder should be carried to the maximum extent possible on the surface of the wood flakes rather than becoming absorbed into the wood flakes where the resin is incapable of serving as a binder for bonding the flakes together. Moreover, while the bulk of resoles are ordinarily sold and applied in the form of a solution, some resoles are reduced to solid condition by spray drying to produce a powder capable of becoming thermoset under heat and pressure as, for example, if the powder is to be used as a molding powder. In connection with such a spray drying operation, it is of distinct advantage to incorporate free lignin in the resole solution so as to minimize the amount of solvent which must be removed for producing a solid powder capable of becoming thermoset by curing. Moreover, the presence of free lignin permits the formation of desirable solid A stage resole type compositions. When a resole is in the A stage, it is of a tarry consistency in the solvent-free condition, and if further reaction is attempted to permit its occurrence in discrete particles, this results in greatly reducing solubility so that either a very large amount of alkali is required or the resole goes over to the essential alkali insoluble B stage. When, however, free lignin is caused to go into mutual solution with the resole prior to removal of solvent, a solid product is obtainable which can occur in discrete particle form, the resole still being in the A stage so that the product may be caused to go into solution again.

For example the solution described hereinbelow under Example 3 for lamination purposes was dried under vacuum to obtain 90% solids material. This material was easily ground to form a fine powder having the lignin and resole intimately admixed together in mutual solutions with each other. This powder is readily cured upon the application of heat without the addition of any curing agent. The powder was also found to be soluble in either ethanol-water or methanol.

Another feature and advantage of this invention resides in the economies, both from the point of view of processing and from the point of yield, which may be accomplished in the practice of this invention. As aforesaid, it is conventional in the production of a resole for shipment and use to evaporate a substantial proportion of the aqueous medium in which the resole is initially produced. The evaporation of the aqueous medium is a step which adds materially to the cost of producing the resole in condition for shipment. Moreover, during the evaporation of the aqueous medium there is substantial evaporation and loss of phenol, formaldehyde, and methylol phenols. According to this invention, the step of evaporating the volatile solvent medium from the resole initially produced may be greatly reduced and preferably eliminated altogether. Thus according to this invention the solids content of the resole initially produced may be increased to that which is desired for impregnating or shipping purposes merely by the addition of free lignin, thereby eliminating both the evaporation step and such losses in yield as normally occur during this step. Moreover, a more efficient use of kettle space is made possible, and by adding free lignin and a lower aliphatic alcohol improved stability for storage is readily afforded while retaining a relatively high solids content.

The presence of the lignin also reduces yield losses during application. Thus in a laminating operation the resole solution which is initially applied to the individual plies is permitted to dry prior to lay-up and final curing. Moreover, in spray application of resole as a binder for fibrous materials or for the production of a dry powder there is drying of the resole by evaporation of volatile solvent therefrom. Whenever such evaporation of volatile solvent occurs there is some loss of phenol or aldehyde or low advanced A stage resin. When, however, a substantial proportion of free lignin is contained in dissolved condition in the applied resole, the presence of the lignin serves to effectively hold otherwise volatile resin-forming ingredients so as to be retained in the cured resin.

In accordance with this invention, it is usually desirable to employ a relatively low advanced A stage resole and, according to a further feature of this invention, the resin-forming reaction with free lignin may be accomplished still more effectively by reaction of phenol with formaldehyde so as to form trimethylol phenol prior to bringing the free lignin into mutual solution. Ordinarily in the preparation of commercial resoles the proportions of formaldehyde and phenol and the reaction conditions prevailing are such that the bulk of the reaction product consists primarily in either monomethylol phenol or dimethylol phenol, or a mixture of the two. By increasing the proportion of the formaldehyde relative to the phenol so that the ratio is at least 3 moles of aldehyde per mole of formaldehyde, the trimethylol phenol may be produced. When this is the case there are three methylol groups for reaction with the free lignin and the resole in this form is especially effective for effecting a resin-forming chemical reaction with the free lignin at a low value for the ratio between A stage resole and added free lignin. Normally it is desirable to employ as much free lignin as possible in relation to the resole without impairing the properties which are obtainable in the cured resin. Highly desirable cured resin products have been obtained according to this invention wherein five parts of free lignin are employed per part of trimethylol phenol on a dry basis. Moreover, even greater free lignin content is possible in the practice of this invention. While resoles may desirably be employed wherein the molar ratio of aldehyde to phenol is the conventional ratio of 1.5:1 or even 1:1, it is preferable, especially when the ratio of lignin to resole is relatively high, to utilize a resole wherein the molar ratio of aldehyde to phenol is of the order of 2:1 to 3:1.

It is a notable feature and advantage of this invention that the properties of the cured resin are not adversely affected and are even enhanced as compared with properties obtainable when the resole is employed in the absence of the added free lignin. Lignin is normally associated with very low water-resistance and poor strength.

However, when the free lignin is brought into mutual solution with a resole, the reactions which occur are such that a new resinous reaction product is produced which exhibits very high strength as well as very high water-resistance and other desirable properties. The strength characteristics are particularly high when the resole is brought into the pH range between about 3 and about 6 by the employment of lignin in its free acid form, thereby providing optimum conditions for developing linkages between the lignin and the resole during curing whereby the resultant resin possesses very high strength characteristics. Moreover, the reaction is such as to block those groups which otherwise would tend to be affected by water, with the result that very high water-resistance is obtained. Because of the phenomena which occur, the resultant cured resin not only is wholly unlike the free lignin which enters into it, but likewise may be produced so as to have properties substantially superior to those which could be obtained from a particular resole in the absence of added lignin.

An A stage resole containing free lignin in mutual solution therewith may be employed in any of the various applications for which A stage resoles have been so extensively employed heretofore. Thus, the resoles find very extensive commercial application in the production of laminated products. Paper laminates are very extensively produced by application of a resole solution containing from about 40% to about 60% of solids to paper sheet material. The volatile solvent vehicle is then removed by evaporation upon application of heat and the resulting dried sheets wherein the resin occurs in the B stage are formed into a multi-ply lamination which is subjected to heat and pressure for curing. Other sheet materials may be similarly formed into laminations and laminates prepared utilizing glass fiber sheet material find extensive commercial use. Resole solutions may likewise be applied to a particulate material which may be either bonded together, as in the production of abrasive wheels, or forced into a suitable base, as in the production of brake linings. Resoles likewise find extensive application in the manufacture of plywood and in the production of so-called flake board wherein flake-like pieces of wood are bonded together. The employment of free lignin is ideally suited for such applications in conjunction with the resole inasmuch as the desired high viscosity for minimizing absorption and loss of binder resin may be provided without resort to such expedients as employment of a very large amount of mineral alkali to hold a viscous resole in solution. Resole solutions likewise are utilized for spray application onto discrete fibers which upon drying may be formed into a coherent mat by shaping the fibers into a suitable sheet or slab or other desired shape and then subjecting the formed material to curing to effect thermosetting of the resin.

Further features of this invention relate to the improvements which are afforded in the production of laminates and related adhesive applications of resoles. In conventional practice it is desirable in the finished product to hold down the proportion of mineral substances whose presence adversely affects both resistance to water absorption and electrical properties. Accordingly, a relatively low advanced resole is employed which may be carried in solution with a relatively low amount of alkali. However, during lamination the low advanced resole lacks sufficient stability to resist excessive squeeze out under heat and pressure, and in order to overcome squeeze out it is ordinary practice to precure the impregnated sheets for several minutes at temperatures of the order of 200° to 250° F. in a suitable drying and precuring oven. Such precuring is, of course, disadvantageous in that it requires a separate processing step in the overall operation. But even more significantly, our experimental work indicates that when excessive precuring is caused to occur, the final cure of the laminated sheets under heat and pressure is impaired. Accordingly, it is an advantage and feature of this invention that by the employment of free lignin stability for resisting squeeze out may be imparted to a low advanced resole with the result not only that the precuring step may be dispensed with, but also that better curing action is afforded with attainment of higher properties because the resole is in the more reactive low advanced condition in solution with the lignin when the laminated impregnated sheet material is subjected to the final cure under heat and pressure. Handling of the sheets likewise is facilitated since the lignin counteracts the sticking of a dried sheet impregnated with the resole unless it has been brought to an undesirably advanced stage.

A further advantage of this invention resides in the fact that free lignin is readily soluble in ammonia catalyzed resoles that are dispersed in aqueous alcoholic solution. Ammonia catalyzed resoles include those catalyzed by ammonia or by an amine; and by dissolving free lignin therein the further advantage is obtained of providing a composition which upon evaporation of the solvent and curing affords a cured resin that is extremely low in ash. By spray drying the ammonia catalyzed resole containing free lignin dissolved therein, a solid composition is obtainable in finely divided form wherein the resole is still in the A stage, the composition being capable of being redissolved in a solvent such as methanol.

In order to provide a better understanding of this invention, typical practice thereof is illustrated in connection with the examples described hereinbelow.

Examples 1 to 9 described below are illustrative of the employment of free lignin in varying proportions as brought into mutual solution with certain commercial A stage resoles; and data respecting their employment in the production of paper laminates ¼" in thickness is presented in tabular form in Tables 1 and 2.

EXAMPLE 1

A commercial resole was employed which is sold by the Bakelite Co., Inc., under the trade designation of BRL–1100. This A stage resole contained 67.7% solids, had a viscosity of 105 centipoises at 25° C. and a pH of 7.7. The ash content of this resole was 0.384% on a solids basis. The product literature for this resole describes it as "a low viscosity phenolic resin which is infinitely dilutable with water for some time after manufacture. . . . BRL–1100 is used as a binder in the manufacture of glass wool insulating material and as an impregnant for densified wood." As indicated by the viscosity at the above solids concentration and by its intended usage, this resole was a relatively low advanced resole. When reference is made herein to "ash content," the reference is to ash content determined by placing 4 grams of the resole or resole solution in a platinum crucible, heating at 135° C. for three hours and then heating in a muffle furnace at substantially 800° C. until constant weight is achieved, which usually requires in the neighborhood of eight hours.

2083 grams of free lignin (96% solids) were mixed with 5908 grams of the resole solution and the mixture subjected to agitation to effect a thorough dispersal of the lignin prior to substantial dissolution of the lignin in the resole solution. The lignin powder dispersed readily to yield initially a viscous slurry containing approximately 75% by weight total solids. In order to provide a solution containing 60% solids, 2008 grams of methanol were added and the lignin dissolved to produce a composition having a viscosity of 124 centipoises at 25° C. and a pH of 4.8. The lignin:resole ratio on a solids basis was 1:2.

EXAMPLE 2

3125 grams of free lignin (96% solids) were added to 4431 grams of the resole BRL–1100 used in Example 1. In order to accommodate the greater proportion of lignin in the resole as compared to Example 1, the mixing procedure of Example 1 was followed except that the lignin was added in successive amounts with intervening additions of methanol until the total amount of lignin had been added. The bulk of the 3353 grams of methanol used, however, was held until all the lignin had been added, at which time it was added. The resulting composition contained 55% solids and had a viscosity of 140 centipoises at 25° C. The pH of this solution was 4.5. The lignin:resole ratio on a solids basis was 1:1.

EXAMPLE 3

4583 grams of free lignin (96% solids) were added to 3250 grams of the resole BRL–1100 used in Examples 1 and 2. The procedure used in Example 2 for the addition of the lignin and methanol to the resole solution was followed in this example. 5367 grams of methanol were used to produce a solution having a 50% solids content, a viscosity of 112 centipoises at 25° C. and a pH of 3.6. The lignin:resole ratio on a solids basis was 2:1.

EXAMPLE 4

A comermcial resole BLL–3526, sold by the Bakelite Co., Inc. was made up with free lignin to produce a laminating varnish having a lignin:resole ratio of 1:2. The viscosity of BLL–3526 at 25° C. was 36.0 centipoises at a solids content of 67.2%. This resole, supplied as a solution in denatured alcohol, is primarily intended for use in laminating paper. It had an ash content of 0.060%, a nitrogen content of 1.065% and a pH of 8.3 and was evidently produced using an ammonia catalyst.

2083 grams of free lignin (96% solids) were added to 5952 grams of BLL–3526 and 1964 grams of methanol were then added according to the procedure set forth in Example 1. The resulting laminating varnish contained approximately 60% solids and had a pH of 6.6 and a viscosity of 544 centipoises at 25° C.

EXAMPLE 5

Another commercial resin sold by Bakelite Co., Inc., under the designation BLSA–3021 was made up with free lignin to produce a laminating varnish having a lignin:resole ratio of 1:2. This resin also is produced especially for use in laminating paper stock. The solids content was 64.2%. The viscosity was 530 centipoises at 25° C. and the pH was 7.4. Analysis of the resin indicated an ash content of only 0.0183% and a nitrogen content of 0.2058%.

To 6240 grams of BLSA–3021, 2084 grams of free lignin (96% solids) and 1676 grams of methanol were added following the procedure of Example 1 to produce a laminating varnish having a solids content of about 60%, a viscosity of 710 centipoises at 25° C. and a pH of 5.4.

EXAMPLE 6

A commercial resin having little strength and intended for use in the first coat impregnation of paper to produce laminates of high insulation resistance was employed. This resin, BLL–3913 sold by Bakelite Co., Inc., as a resin solution in methanol, according to the manufacturer's literature, ". . . does not possess sufficient bonding strength to produce a laminate and a second coat of a regular grade electrical grade laminating varnish must be applied before the press operation." At 59.4% solids this resin had a viscosity of 56 centipoises at 25° C. and a pH of 5.9. The ash and nitrogen content of the resin was 0.1773% and 0.0375%, respectively.

6734 grams BLL–3913, 2083 grams free lignin (96% solids) and 1183 grams methanol were combined as in Example 1. The resulting solution had a solids content of 60%, a viscosity of 184 centipoises at 25° C. and a pH of 3.2.

EXAMPLE 7

A commercial resin sold by the Durez Plastics Division, Hooker Electrochemical Co., under the trade designation Durez 19161, was made up with free lignin to produce a laminating varnish. This resin, a low advanced resole, had a viscosity of 490 centipoises at 25° C. and a pH of 6.8 at a 68% solids concentration. Its ash content was 0.54% and it contained 0.62% nitrogen. Here and elsewhere herein nitrogen is determined by the semi-micro Kjedahl analysis method.

2810 grams of free lignin (96% solids) were combined with 7710 grams of Durez 19161 and 2877 grams of a 60:40 ethanol:water solution using the procedure set forth in Example 1. The resulting solution had a solids content of 60%, a viscosity of 240 centipoises at 25° C. and a pH of 5.85. The lignin:resole ratio on a solids basis was 1:2.

EXAMPLE 8

Using the same resin as was used in Example 7, a laminating varnish was formulated by combining 2292 grams of free lignin (96% solids), 3235 grams of Durez 19161 resin and 3273 grams of 60:40 ethanol:water solution, according to the procedure set forth in Example 2. The resulting solution had a solids content of 50%, a viscosity of 274 centipoises at 25° C., and a pH of 5.8. The lignin:resole ratio on a solids basis was 1:1.

EXAMPLE 9

A blend of commercial resins BRLA–1030 and BRL–1100 used in Examples 1 to 3 was used in the formulation of a laminating varnish containing approximately 55% solids. BRLA–1030 is the designation of the Bakelite Co., Inc. for a commercial product which consists essentially of 70% aqueous solution of trimethylol phenol, a type of resole wherein each of the reactive positions on the molecule, namely, the 2, 4, 2' positions has been substituted with a methylol group. A solution was first formed by mixing equal quantities on a solids basis of BRLA–1030 and BRL–1100 together. 2143 grams of BRLA–1030 and 2216 grams of BRL–1100 were used in this step. To this solution 3125 grams of free lignin (96% solids) were added with good agitation. This was followed by the addition of 3405 grams of a 60:40 ethanol:water solution to form a varnish having a viscosity of 420 centipoises at 25° C. and a pH of 4.15.

The compositions of Examples 1 to 9 were employed in the production of paper laminates. The laminates were prepared using kraft paper weighing approximately 100 lbs. per 3,000 sq. ft. For application to the paper the composition of each of the samples was diluted with the solvent vehicle employed therefor to obtain a viscosity suitable for impregnation of the paper. This was generally obtained at a non-volatile content of approximately 40%. The resin pickup on the paper to be laminated was controlled by a single or double dip of the paper in the compositions prepared in Examples 1 through 9. A single dip resulted in resin pickup of the order of 40% by dry weight of the resin in the total weight of the laminate. A second dip used in certain instances resulted in a resin pickup in the neighborhood of 50% resin by dry weight.

Each of the sheets after impregnation was air dried for 5 minutes or longer and subjected to a precure treatment as indicated in Table 1 below. After precuring sheets prepared as described above were stacked and placed in a press and subjected to heat and pressure to effect curing.

The press conditions for effecting the curing are indicated in Table 1.

The compositions of Examples 1 through 9 were also utilized in the production of glass cloth laminates. These Table 1
PRECURE AND PRESS CONDITIONS

| Ex. No. | Precure conditions | Press conditions | | | Laminate thickness, inches |
|---|---|---|---|---|---|
| | | Temp., °F. | Time, hr. | Pressure, p.s.i. | |
| 1 | 5 min. 200° F., 5 min. 225° F., 5 min. 250° F. | 340 | 1 | 1,000 | 0.25 |
| 2 | 5 min. 200° F., 5 min. 225° F., 5 min. 250° F. | 340 | 1 | 1,000 | 0.25 |
| 3 | 5 min. 200° F., 5 min. 225° F. | 340 | 1 | 1,000 | 0.25 |
| 4 | 5 min. 200° F., 5 min. 225° F. | 340 | 1 | 1,000 | 0.25 |
| 5 | 5 min. 200° F., 5 min. 225° F. | 340 | 1 | 1,000 | 0.25 |
| 6 | 5 min. 200° F., 10 min. 225° F. | 340 | 1 | 1,000 | 0.25 |
| 7 | 5 min. 200° F., 10 min. 225° F. | 340 | 1 | 1,000 | 0.25 |
| 8 | 5 min. 200° F., 5 min. 225° F., 5 min. 250° F. | 340 | 1 | 1,000 | 0.25 |
| 9 | 5 min. 200° F., 5 min. 225° F. | 340 | 1 | 1,000 | 0.25 |
| Controls: | | | | | |
| BLSA-3021 | 5 min. 200° F., 5 min. 225° F. | 340 | 1 | 1,000 | 0.25 |
| GE-12303 | 5 min. 200° F., 5 min. 225° F. | 340 | 1 | 1,000 | 0.25 |
| GE-12304 | 5 min. 200° F., 5 min. 225° F. | 340 | 1 | 1,000 | 0.25 |
| GE-13111 | 5 min. 200° F., 5 min. 225° F. | 340 | 1 | 1,000 | 0.25 |

The properties of the laminates produced as above described are set forth in Table 2 in comparison with the corresponding properties obtained utilizing conventional resoles manufactured for lamination of paper. The resole sold under the trade designation BLSA-3021 by the Bakelite Co., Inc., is a medium advanced resole containing 67.2% solids and having a viscosity of 530 centipoises at 25° C. and a pH of 8.3. The resole sold under the trade designation GE-12303 by General Electric Company, Inc., had a solids content of 76.5%, a viscosity of 22,850 centipoises at 25° C. and a pH of 6.3. The resole sold under the trade designation GE-12304 by General Electric Company, Inc., had a solids content of 68%, an ash content of 0.421%, a viscosity of 310 centipoises at 25° C. and a pH of 6.1. The resole sold under the trade designation GE-13111 by the General Electric Company, Inc., had a solids content of 66.4%, an ash content of 0.575%, a nitrogen content of 0.0458%, a viscosity of 400 centipoises at 25° C. and a pH of 7.9.

Table 2
PAPER LAMINATES—PHYSICAL PROPERTIES

| Ex. No. | Percent resin content | Flexural strength, p.s.i. | Flexural modulus ×10⁶ | Water adsorption, percent |
|---|---|---|---|---|
| 1 | 48.0 | 19,400 | 1.39 | 1.47 |
| 2 | 47.2 | 22,000 | 1.56 | 0.93 |
| 3 | 40.0 | 17,400 | 1.59 | 0.88 |
| 4 | 49.9 | 27,500 | 1.46 | 1.07 |
| 5 | 49.3 | 19,800 | 1.19 | 1.51 |
| 6 | 44.8 | 22,100 | 1.65 | 1.42 |
| 7 | 37.0 | 24,260 | 1.66 | 1.60 |
| 8 | 44.0 | 21,100 | 1.65 | 1.20 |
| 9 | 40.4 | 19,940 | 1.78 | 0.87 |
| Controls: | | | | |
| BLSA-3021 | 40.5 | 21,050 | 1.49 | 2.2 |
| BLSA-3021 | 47.1 | 21,780 | 1.41 | 1.3 |
| GE-12303 | 41.0 | 20,195 | 1.39 | 1.22 |
| GE-12304 | 39.0 | 20,362 | 1.33 | 1.39 |
| GE-13111 | 46.0 | 17,812 | 1.22 | 1.39 |

The flexural strength values referred to in the foregoing table and elsewhere herein were determined in accordance with A.S.T.M. specification #D790–49T. The values are expressed in pounds per square inch. The water-resistance was determined according to A.S.T.M. specification #D575–57T. The values given above and elsewhere are the gain in weight on soaking for 24 hours as a percentage of the weight of the laminate.

laminates were formed utilizing the same precure and press conditions set forth in Table 1. The properties of the glass cloth laminates, made using "Flightex" A–1100 glass cloth are set forth in Table 3 in comparison with a glass cloth laminate prepared using a conventional resole specifically manufactured for lamination of glass cloth. This resole was Bakelite's BLL–3085 containing 59% to 64% solids and having a viscosity at 25° C. of from 125 to 176 centipoises. The control was precured for 5 minutes at 200° F., 5 minutes at 225° F. and 5 minutes at 250° F. and the final cure of the laminate was effected at 340° F. for one hour at 1000 p.s.i. and the resulting laminate was 0.12 inch in thickness.

Table 3
GLASS CLOTH LAMINATES—PHYSICAL PROPERTIES

| Ex. No. | Percent resin content | Flexural strength, p.s.i. | Flexural modulus ×10⁶ | Water adsorption, percent |
|---|---|---|---|---|
| 1 | 24.1 | 66,500 | 4.12 | 1.31 |
| 2 | 27.6 | 84,000 | 4.40 | 0.45 |
| 3 | 33.1 | 74,800 | 3.69 | 0.47 |
| 4 | 38.8 | 74,000 | 3.78 | 0.33 |
| 5 | 37.0 | 77,750 | 4.10 | 0.33 |
| 6 | 36.0 | 71,800 | 3.90 | 0.78 |
| 7 | 30.7 | 88,600 | 4.20 | 0.32 |
| 8 | 30.4 | 98,800 | 4.03 | 0.33 |
| 9 | 29.3 | 71,700 | 3.60 | 0.59 |
| Control: | | | | |
| BLL-3085 | 32.5 | 72,400 | 4.01 | 0.38 |
| BLL-3085 | 37.0 | 76,150 | 3.43 | 0.35 |

As can be seen from the foregoing tables, laminates possessing a very high order of properties can be produced wherein large quantities of lignin are combined with the resole. The high strength values of phenol-formaldehyde resin laminates can not only be maintained by the inclusion of lignin but most surprisingly can be greatly increased by utilization of lignin according to this invention without adversely affecting the moisture-resistance of the final laminate. When glass fiber is used in the manufacture of laminates, a principal reason for doing so is to impart high strength and it is significant that values were obtained running considerably higher than those heretofore regarded as obtainable utilizing a resole type resin, while at the same time resistance to water adsorption was enhanced rather than otherwise. Moreover, for most commercial applications the greater stiffness indicated by the flexural modulus values is a desirable feature.

EXAMPLE 10

Using the lignin-resole laminating varnish formulated in Example 7, additional experiments were performed to determine the effect of precure and press conditions upon the properties of the laminates produced. Using the precure and press conditions in Table 4, the properties in Table 5 were obtained for samples 10a through 10f.

*Table 4*

PRECURE AND PRESS CONDITIONS

| Example No. | Precure | Press conditions | | |
|---|---|---|---|---|
| | | Temp., °F. | Time, hr. | Pressure, p.s.i. |
| 10a | None | 300 | 1 | 1,000 |
| 10b | 5 min. 105° C | 300 | 1 | 1,000 |
| 10c | 10 min. 105° C | 300 | 1 | 1,000 |
| 10d | None | 300 | 1 | 1,000 |
| 10e | ----do---- | 325 | 1 | 1,000 |
| 10f | ----do---- | 340 | 1 | 1,000 |

*Table 5*

PAPER LAMINATES—PHYSICAL PROPERTIES

| Example No. | Laminate thickness, inches | Percent resin content | Water adsorption, percent | Flexural strength, p.s.i. |
|---|---|---|---|---|
| 10a | 0.113 | 28.7 | 2.5 | 28,728 |
| 10b | 0.112 | 28.7 | 2.2 | 29,489 |
| 10c | 0.111 | 28.7 | 2.4 | 28,743 |
| 10d | 0.123 | 35.9 | 2.4 | 26,063 |
| 10e | 0.138 | 35.9 | 2.3 | 25,515 |
| 10f | 0.141 | 35.9 | 2.8 | 24,579 |

The following Examples 11 to 18 illustrate the use of four commercial resoles in the formulation of additional lignin containing laminating varnishes and the use of these varnishes in the manufacture of laminates without any precuring before final curing.

EXAMPLE 11

A commercial resole manufactured by the Monsanto Chemical Co. and sold under the trade designation of Resinox #451 was used to formulate a lignin-containing resin. Resinox #451 had a solids content of 64.6% and a viscosity at 25° C. of 324 centipoises. The pH was 7.25 and the ash content and nitrogen content were 0.219% and 0.423%, respectively. To 620 grams of Resinox #451, 420 grams of free lignin (97% solids) were added with 960 grams of methanol according to the procedure of Example 2. This resulted in a solution having a calculated solids content of 40%, a pH of 5.45 and a viscosity of 50 centipoises at 25° C. The lignin:resole ratio was 1:1 on a solids basis.

EXAMPLE 12

Using the same commercial resin as was used in Example 11, a decreased amount of lignin was added to produce a varnish having a lignin:resole ratio on a solids basis of 1:2. 287 grams of free lignin (97% solids) was added to 830 grams of Resinox #451 together with 890 grams of methanol using the procedure of Example 1. This produced a solution having a calculated solids content of 40%, a pH of 6.05 and a viscosity at 25° C. of 34 centipoises.

EXAMPLE 13

The commercial resole hereinabove described in connection with Tables 1 and 2 and sold by the General Electric Company under the designation GE-12303 was used in this example. 353 grams of free lignin (97% solids) was added to 575 grams of GE-12303. This was followed by the addition of 1171 grams of methanol according to the procedure in Example 2. The pH of the resulting solution having a calculated solids content of 40% was 4.3. The viscosity at 25° C. was 30 centipoises. The lignin:resole ratio on a solids basis was 1:1.

EXAMPLE 14

To 842 grams of GE-12303 resole used in Example 13, 331 grams of free lignin (97% solids) and 1126 grams of methanol were added as in Example 1. The resulting solution having a calculated solids content of 42% had a pH of 5.05 and a viscosity at 25° C. of 30 centipoises. The lignin:resole ratio on a solids basis was 1:2.

EXAMPLE 15

The commercial resole hereinabove described in connection with Tables 1 and 2 and sold under the designation GE-12304 was used with lignin in formulating a varnish having a calculated solids content of 40% and a lignin:resole ratio on a solids basis of 1:1. 412 grams of free alkali lignin (97% solids) were added together with 1000 grams of methanol to 590 grams of GE-12304 resole. The resulting solution had a pH of 4.3 and a viscosity of 46 centipoises at 25° C.

EXAMPLE 16

To 783 grams of the GE-12304 resole used in Example 15, 274 grams of free alkali lignin (97% solids) and 543 grams of methanol were added as in Example 1. The resulting solution had a calculated solids content of 40%. The viscosity was 46 centipoises at 25° C. and the pH was 4.3. The lignin:resole ratio on a solids basis was 1:1.

EXAMPLE 17

The commercial resole hereinabove described in connection with Tables 1 and 2 and sold under the designation GE-13111 was used to formulate a laminating varnish having a calculated solids content of 42% and a lignin:resole ratio on a solids basis of 1:1. To 729 grams of GE-13111 resole, 498 grams of free lignin (97% solids) and 1071 grams of methanol were added as in Example 2 to produce a solution having a pH of 5.2 and a viscosity of 34 centipoises at 25° C.

EXAMPLE 18

The resole GE-13111 used in Example 17 was used to produce a laminating varnish having a lignin:resole ratio of 1:2 on a solids basis at a calculated solids content of 42%. 331 grams of free lignin (97% solids) and 995 grams of methanol were added to 973 grams of GE-13111 resole. The solution thus produced had a pH of 6.05 and a viscosity of 26 centipoises at 25° C.

The compositions prepared in Examples 11 through 18 were employed in the production of paper laminates. The pickup of resin on the paper, which was a kraft paper weighing 100 lbs. per 3000 sq. ft., was controlled by passing the paper through press rolls after dipping the paper in the resin compositions. After passing through the press rolls the saturated paper was allowed to air dry at approximately 70° F. and 50% relative humidity. During this air drying the volatile content as determined at 105° C. was reduced to about 3% to 8%. After drying the sheets were stacked and laminated in a press. The press conditions for these laminates was 1 hour at 300° F.

under 1000 p.s.i. pressure. The physical properties of the laminates produced are shown in Table 6.

Table 6
PAPER LAMINATES—PHYSICAL PROPERTIES

| Ex. No. | Laminate thickness, inches | Percent resin content | Water adsorption, percent | Flexural strength, p.s.i. |
|---|---|---|---|---|
| 11a | 0.122 | 29.7 | 2.7 (4.7% 72 hrs.) | 24,556 |
| b | 0.118 | 28.3 | 2.2 | 24,420 |
| c | 0.233 | 28.2 | 1.1 | |
| 12a | 0.121 | 28.6 | 2.9 (5.0% 72 hrs.) | 23,889 |
| b | 0.121 | 28.6 | 2.1 | 24,485 |
| c | 0.238 | 28.2 | 1.7 | |
| 13a | 0.120 | 28.8 | 2.1 (3.8% 72 hrs.) | 24,986 |
| b | 0.119 | 28.8 | 1.8 | 26,172 |
| c | 0.236 | 28.7 | 0.9 | |
| 14a | 0.118 | 28.7 | 2.0 (3.6% 72 hrs.) | 25,912 |
| b | 0.117 | 28.7 | 1.7 | 26,301 |
| c | 0.234 | 28.6 | 0.9 | |
| 15a | 0.120 | 29.0 | 1.7 (3.2% 72 hrs.) | 23,966 |
| b | 0.118 | 29.0 | 1.5 | 26,160 |
| c | 0.231 | 28.8 | 0.9 | |
| 16a | 0.123 | 32.6 | 1.8 (3.2% 72 hrs.) | 24,061 |
| b | 0.119 | 32.6 | 1.2 | 24,848 |
| c | 0.234 | 33.7 | 0.7 | |
| 17a | 0.118 | 28.3 | 2.5 (4.5% 72 hrs.) | 25,689 |
| b | 0.117 | 28.6 | 2.3 | 25,566 |
| c | 0.233 | 28.3 | 1.1 | |
| 18a | 0.118 | 28.0 | 2.8 (4.8% 72 hrs.) | 25,257 |
| b | 0.117 | 28.0 | 2.1 | 25,986 |
| c | 0.238 | 28.6 | 1.1 | |
| Control: BLSA–3021 | 0.120 | 32.8 | 5.2 | 27,578 |

The laminate using control BLSA–3021 described hereinabove was subject to a precure of 5 minutes at 105° C. before final curing to reduce the "squeeze out" during pressing. It was cured at 300° F. for 1 hour at 1,000 p.s.i. pressure.

As can be seen from the foregoing table, laminates possessing a high order of properties can be prepared utilizing lignin-containing resins which require no separate precuring prior to final curing in the press. Incorporation of lignin with the resole changes the flow characteristics of the resole sufficiently that after evaporation of the solvent advancement of the resole is not necessary to prevent excessive "squeeze out" of resin from the laminate when curing at high pressures. It should be noted that at resin content levels of less than 30% the good water adsorption properties of the cured laminate are retained utilizing lignin-containing resoles, whereas at a low resin content the water adsorption of the laminates employing BLSA–3021 increased markedly. After 72 hours' soaking the lignin-resole laminates at a lower resin content had increased in weight less than the control after only 24 hours' soaking.

Examples 19 to 23 illustrate the practice of this invention employing trimethylol phenol, a type of resole wherein all of the reactive positions on the phenol molecule have been substituted with a methylol group. Since no reactive positions for cross-linking remain on the phenol molecule trimethylol phenol does not give as satisfactory results when used in laminating applications as most commercial resoles.

EXAMPLE 19

Trimethylol phenol is available commercially as an approximately 70% aqueous solution under the Bakelite Co., Inc., designation BRLA–1030. The viscosity of BRLA–1030 at 25° C. was 126 centipoises and the pH was 7.7. The ash content was 0.812%. 1000 grams of BRLA–1030, 345 grams of free lignin (96% solids), and 385 grams of methanol were mixed according to the procedure of Example 1 to produce a solution of 60% solids. The viscosity of this laminating varnish was 170 centipoises at 25° C. and the pH was 5.5. The lignin:resole ratio on a solids basis was 1:2.

EXAMPLE 20

Using the procedure of Example 2, 469 grams of free lignin (96% solids) were combined with 643 grams of the trimethylol phenol solution used in Example 19, BRLA–1030, and 525 grams of methanol to produce a laminating varnish of approximately 55% solids having a viscosity of 190 centipoises at 25° C. and a pH of 5.05. The lignin:resole ratio for this solution on a solids basis was 1:1.

EXAMPLE 21

Employing the trimethylol solution, BRLA–1030 used in Example 19, a laminating varnish was made containing a lignin:resole ratio of 3:1. Due to the large quantity of lignin used, a slightly different procedure was utilized in formulating this varnish. 625 grams of free lignin (96% solids) were added to 689 grams of methanol and the mixture agitated. 286 grams of BRLA–1030 were added to the lignin-methanol mixture to form a solution of approximately 50% solids. The viscosity of this solution was 308 centipoises at 25° C. and the pH was 4:3.

EXAMPLE 22

A laminating varnish containing a lignin:resole ratio of 4:1 was formulated by the procedure set forth in Example 11 employing the trimethylol phenol solution, BRLA–1030, utilized in Example 19. 750 grams of free lignin (96% solids), 257 grams of BRLA–1030 and 793 grams of methanol were combined to produce a varnish of approximately 50% solids having a viscosity of 330 at 25° C. and a pH of 4.2.

EXAMPLE 23

A laminating varnish of even greater lignin:resole ratio than Example 22 was prepared using the procedure of Example 21. 214 grams of BRLA–1030, 781 grams of free lignin (96% solids) and 804 grams of methanol were combined to form a solution containing approximately 50% solids and having a lignin:resole ratio of 5:1. The viscosity of this solution was 490 centipoises at 25° C. and the pH was 4.1.

Using the procedures employed for impregnation and lamination in connection with the compositions of Examples 11 through 18, laminates were prepared using the compositions of Examples 19 through 23 and BRLA–1030 as a control. The press conditions were the same except that Examples 22 and 23 were pressed at press temperatures of 275° F. and 260° F., respectively.

The physical properties of the laminates appear in Table 7.

Table 7
PAPER LAMINATES—PHYSICAL PROPERTIES
[Examples 19-23]

| Ex. No. | Lignin resole ratio | Laminate thickness, inches | Percent resin content | Water adsorption, percent | Flexural strength, p.s.i. |
| --- | --- | --- | --- | --- | --- |
| 19 | 1:2 | 0.112 | 27.4 | 2.4 | 22,31 |
| 20 | 1:1 | 0.111 | 26.6 | 2.55 | 22,743 |
| 21 | 3:1 | 0.121 | 28.2 | 3.3 | 20,944 |
| 22 | 4:1 | 0.118 | 28.1 | 2.5 | 18,540 |
| 23 | 5:1 | 0.116 | 28.0 | 2.6 | 22,900 |
| Control: BRLA-1030 | | 0.115 | 28.8 | 3.6 | 18,859 |

The data appearing in the preceding table shows that whereas trimethylol phenol is less desirable for lamination than most commercial resoles, it is particularly advantageous for reaction with free lignin and favors the development of effective cross-linking with the lignin even at very high ratios of lignin to resole.

The following examples illustrate the production of alkaline catalyzed resoles carried to the A stage, followed by the addition of free lignin which serves both to provide an increased solids content without evaporation of a portion of the aqueous medium in which the A stage resole is formed and to not only neutralize the alkali catalyst but also to provide an acidic composition favorable to the production of improved thermoset resin products according to this invention.

EXAMPLE 24

Instead of using a commercial resole in the preparation of a lignin-containing laminating varnish, a resole was prepared by reacting phenol and formaldehyde in the presence of a sodium hydroxide catalyst. 282 grams of phenol crystals were placed in a flask. To the phenol 365 grams of 37% formalin and 12 grams of 50% sodium hydroxide solution were added. This was heated to 100° C. and maintained at a temperature between 97° and 100° C. for 15 minutes. At the end of this time the solution was cooled to 85° C. and 358 grams of free lignin (96% solids) were added. The lignin went into solution very readily. To decrease the solids content to 55%, 222 grams of ethanol were added to form a solution which at 25° C. had a pH of 5.58 and a viscosity of 260 centipoises. The solvent medium consisted of a 60:40 water:ethanol mixture.

EXAMPLE 25

282 grams of phenol, 365 grams of 37% formalin and 12 grams of sodium hydroxide (50% solution) were cooked together as in Example 24 for ten minutes at approximately 98° C. The sample was cooled to 90° C. and 354 grams of free lignin (96% solids) were added followed by 222 grams of ethanol forming a fluid solution. The pH of this solution at 55% solids was 5.55 and the viscosity 308 centipoises at 25° C. The solvent medium consisted of a 60:40 water:ethanol mixture.

EXAMPLE 26

Utilizing the same procedures as in Example 24, 282 grams of phenol, 365 grams of 37% formalin, and 12 grams of sodium hydroxide (50% solution) were cooked together for 20 minutes at a temperature between 98° and 100° C. The resulting resole was cooled to 77° C. and 354 grams of free lignin (96% solids) were added with good agitation. 222 grams of ethanol were next added to produce a laminating varnish having a 55% solids content, a pH of 5.45 and a viscosity of 370 centipoises at 25° C.

EXAMPLE 27

282 grams of phenol, 585 grams of 37% formalin and 12 grams of sodium hydroxide (50% solution) were cooked together as in Example 24 for 40 minutes at a temperature between 92° and 94° C. After cooking had been completed the resole was cooled to 80° C. and 745 grams of free lignin (96% solids) and 720 grams of ethanol were added. After addition of approximately two-thirds of the lignin the viscosity rose to such an extent that approximately one-third of the ethanol had to be added before the remaining lignin could be stirred in. After all the ethanol had been added, a 47% solids solution was obtained having a pH of 4.9 and a viscosity of 360 centipoises.

The following examples are similar to Examples 25 and 26 except that the catalyst was reduced by one-half.

EXAMPLES 28

282 grams of phenol, 365 grams of 37% formalin and 6.0 grams of 50% sodium hydroxide were cooked together as in Example 24, for 10 minutes at 95° C. The resulting resole was cooled and 354 grams of free lignin (97% solids) were added. This was followed by 222 grams of ethyl alcohol. The viscosity of the resulting solution was 2240 centipoises at 250° C. and the pH was 5.0. The calculated solids content was approximately 55%.

EXAMPLE 29

282 grams phenol, 585 grams of 37% formalin and 6.0 grams of a 50% solution of sodium hydroxide were cooked together at 95° C. for 40 minutes following the procedure of Example 24. The reaction mixture was cooled to 80° C. and 745 grams of free lignin (97% solids) and 720 grams ethanol were added. The solution having a calculated solids content of approximately 47.5% had a viscosity of 300 centipoises at 25° C. and a pH of 4.2.

In the following examples cresylic acid was used instead of phenol in the cooking of the resole.

EXAMPLE 30

488 grams of cresylic acid having a typical composition of 38%–42%, 3,5-xylenol; 30%–35% 3,4-xylenol; 15%–20% ethyl phenol; 6%–8% 2,4:2,5 and 2,3-xylenols, and 1%–2% $C_9$ phenols, 365 grams of 37% formalin and 12 grams of a 50% solution of sodium hydroxide were added together in a flask and heated to 92° C. This temperature was maintained for 20 minutes when the flask was immersed in a cold water bath and the reaction products cooled to 80° C. 311 grams of free lignin (96% solids) were added with 376 grams of ethyl alcohol using the procedure in Example 2. The resultant solution at a calculated 60% solids had a pH of 6.3 and a viscosity of 3,104 centipoises at 25° C. 1304 grams of this solution were further diluted with 261 grams of ethyl alcohol to give a solution at a calculated solids of 50% having a viscosity of 532 centipoises at 25° C. This more fluid solution was used in lamination.

EXAMPLE 31

460 grams of cresylic acid having a typical composition of 40%–45% meta cresol; 16%–19% para cresol, 2%–4% ortho cresol; 13%–15% 2,6:2,4:2,5 and 2,3-xylenols; 6%–8% ethyl phenol; 13%–15% 3,5 and 3,4-xylenols and 2%–3% $C_9$ phenols were added with 365 grams of 37% formalin and 12 grams of a 50% sodium hydroxide solution to a flask and heated to 93° C. This temperature was maintained for 20 minutes when the reaction products were cooled to 90° C. by placing the flask in a cold water bath. 311 grams of free lignin (96% solids) and 376 grams of ethyl alcohol were added to the reaction product using the procedure in Example 2 and reducing the temperature to 49° C. The resultant solution having a calculated solids content of approximately 55% had a viscosity of 500 centipoises at 25° C. and a pH of 6.1.

The compositions of Examples 24 through 31 were also employed in the lamination of paper utilizing the same procedures for impregnation and curing as were used for Examples 11 through 18. In all cases the laminates were pressed for one hour at 1000 p.s.i. The temperature for Examples 24-26 was 300° F. and for Examples 27 through 31 275° F. The physical properties of the laminates are shown in Table 8.

*Table 8*

PAPER LAMINATES—PHYSICAL PROPERTIES

| Ex. No. | Laminate thickness, inches | Percent resin content | Water adsorption, percent | Flexural strength, p.s.i. |
|---|---|---|---|---|
| 24 | 0.076 | 42.3 | 2.95 | 24,923 |
| 25 | 0.074 | 41.2 | 2.95 | 25,361 |
| 26 | 0.076 | 42.0 | 2.75 | 25,434 |
| 27 | 0.125 | 31.9 | 1.5 | 24,266 |
| 28 | 0.111 | 28.6 | 2.6 | 27,221 |
| 29 | 0.115 | 28.7 | 2.1 | 26,559 |
| 30 | 0.121 | 28.9 | 4.5 | 27,391 |
| 31 | 0.120 | 28.6 | 2.8 | 28,021 |

As shown by the above examples, lignin can be added to the resole at the end of the cook without evaporation of any of the solvent medium. By such a process considerable savings in heat, time and kettle space may be realized. The laminates formed from lignin-containing resins formed in this manner as shown in Table 8 also possess a high order of physical properties.

As shown by Examples 30 and 31, resoles produced from phenolic compounds other than phenol can advantageously be used with free lignin in the formulation of laminating varnishes. These varnishes, while of considerably lower cost than those in which phenol is employed, also possess the high order of properties characteristic of laminates prepared from resoles containing free lignin.

The free lignin used in all of the above examples was recovered from black liquor obtained from the pulping of pinewoods with sulfate cooking liquors. In the recovery of this lignin the black liquor was first acidified using sulfuric acid to a pH of approximately 9 to 10 to precipitate the lignin in the form of its sodium salt. After washing to remove most of the black liquor occluded with the lignin during precipitation the lignin sodium salt was acid washed, using dilute sulfuric acid, at a pH of approximately 2 to free the lignin from its salt form. After drying the free lignin thus produced contained about 0.5 to 1.5% ash which was composed primarily of silicates and inorganic salts from the black liquor and acid used in the recovery process and which remained with the lignin during drying.

While the use of such free sulfate pine lignin has been extensively illustrated in the above examples, other lignin fractions and modified lignins may be advantageously utilized in the practice of this invention. The following examples illustrate the employment of several different lignin fractions and modified lignins according to this invention.

EXAMPLE 32

The free pine sulfate lignin used in the above examples was modified by reacting it with formaldehyde prior to combination with a commercial resole. Free lignin, formaldehyde and sodium hydroxide were added to water in a molar ratio of 1 mole lignin, 1.5 moles formaldehyde and 1 mole of sodium hydroxide to form a 20% solution. This was reacted at 190° F. for three hours, after which the reaction mixture was diluted and acidified with sulfuric acid to a pH of approximately 2. During acidification the lignin-formaldehyde product precipitated and was recovered by filtration. 665 grams of BRL-1100 resole used in Example 1, 528 grams of the air dried lignin-formaldehyde product (85.2% solids) and 444 grams of methanol were mixed together to form a solution of approximately 55% solids. The viscosity of this solution at 25° C. was 1180 centipoises and the pH was 4.7. The lignin:resole ratio was 1:1 on a solids basis. The solution was further diluted with methanol prior to impregnation of paper to about 40% solids at a viscosity of 69 centipoises at 25° C.

EXAMPLE 33

Instead of using lignin derived from pine woods, lignin obtained from black liquor from the cooking of hardwoods was employed. Recovery of this free hardwood lignin was accomplished in the same manner as used for the recovery of the pine lignin described above. 665 grams of the commercial resole BRL-1100 used in Example 1, 475 grams of free hardwood sulfate lignin (94.7% solids) and 497 grams of methanol were mixed together to form a solution of approximately 55% solids. The pH of this solution was 4.3 and the viscosity 84 centipoises at 25° C. The lignin:resole ratio on a solids basis was 1:1. Before impregnation of paper with this solution for lamination it was diluted to 40% solids with methanol. The viscosity of this lower solids concentration was 16 centipoises at 25° C.

EXAMPLE 34

Lignin derived from sulfate pulping of hardwood was also used in this example. However, instead of utilizing only the fraction of lignin precipitated at a pH of approximately 9 to 10 the entire range of lignin fractions was employed by precipitating the lignin at a pH of approximately 2. 564 grams of this free hardwood lignin (79.7% solids), 665 grams of the commercial resole BRL-1100 employed in Example 1, and 407 grams of methanol were mixed to produce a solution of approximately 55% solids. The pH and viscosity at 25° C. were 3.88 and 60 centipoises, respectively. The lignin:resole ratio was 1:1 on a solids basis. This solution was further diluted to 39% solids for impregnation of paper for laminating. The viscosity of this dilute solution was 15 centipoises at 25° C.

EXAMPLE 35

The pine sulfate lignin used in Examples 1 through 31 was extracted with acetone. Two lignin fractions were thus obtained, an acetone soluble fraction and an acetone insoluble fraction. 465 grams of the acetone soluble lignin (96.8% solids), 665 grams of the commercial resole BRL-1100 used in Example 1, and 507 grams of methanol were mixed to produce a solution of approximately 55% solids. The pH was 4.7 and the viscosity 76 centipoises at 25° C. The lignin:resole ratio was 1:1 on a solids basis. This solution was further diluted to 40% solids with methanol before impregnation of the paper. The viscosity was 15 centipoises at 25° C.

EXAMPLE 36

466 grams of the acetone insoluble lignin fraction (96.6% solids) obtained from Example 35, 665 grams of the commercial resin BRL-1100 used in Example 1, and 506 grams of methanol were mixed to produce a solution having a solids content of approximately 55%, a pH of 4.3 and a viscosity at 25° C. of 1020 centipoises. This solution was diluted to 40% solids prior to impregnation of paper for laminating. The viscosity of this solution was 56 centipoises at 25° C.

EXAMPLE 37

The lignin used was a free pine sulfate lignin produced as above described except that instead of being precipitated at a pH between 9 to 10 it was precipitated from the black liquor at a pH between 10.5 and 11. 471 grams of this high pH precipitated lignin (95.5% solids), 665 grams of the commercial resole BRL-1100 used in Example 1 and 500 grams of methanol were mixed to produce a solution with a solids content of approximately 55%. This solution had a viscosity of 180 centipoises at 25° C. and a pH of 4.28. A viscosity of 18 centipoises was obtained when this solution was diluted with methanol to a 39% solids content. The lignin:resole ratio was 1:1.

EXAMPLE 38

After removal of the lignin which is precipitated at a pH between 9 and 10 additional fractions of lignin can be obtained from the black liquor by acidification to a lower pH. The black liquor filtrate obtained from the recovery of the lignin used in Examples 1 through 31 was further acidified to a pH of approximately 8. This acidification precipitated a sodium salt of lignin which was further processed according to the procedures set forth above to free the lignin from its salt. 468 grams of this low pH precipitated free lignin (96.2% solids), 665 grams of the commercial resole BRL-1100 used in Example 1, and 504 grams of methanol were mixed to produce a solution having a solids content of approximately 55%, a pH of 3.85 and a viscosity at 25° C. of 64 centipoises. This solution was further diluted with methanol to a 42.7% solids solution having a viscosity of 17 centipoises at 25° C. The lignin-resole ratio was 1:1 on a solids basis.

EXAMPLE 39

A free lignin such as that used in Examples 1 through 31 was modified by cooking it with alkali. 4 parts by weight of free pine sulfate lignin and 1.5 parts by weight of sodium hydroxide were added to 30 parts by weight of water. This solution was then heated to 160°–170° C for approximately five hours. The reaction mixture was cooled and acidified with sulfuric acid to a pH of about 2, causing the lignin to precipitate. 463 grams of this alkali cooked free lignin (97.3% solids), 665 grams of the commercial resole BRL-1100 used in Example 1 and 509 grams of methanol were mixed together to form a solution of approximately 55% solids having a pH of 2.82 and a viscosity at 25° C. of 54 centipoises. This solution was further diluted with methanol to 39.8% solids for impregnation of paper. The viscosity of this solution was 14 centipoises at 25° C. The lignin:resole ratio on a solids basis was 1:1.

EXAMPLE 40

The free lignin employed in Examples 1 to 31 was washed extensively with water to reduce the ash content of the lignin. The ash content of this lignin was 0.10%. 548 grams of this low ash lignin (98.3% solids), 665 grams of the commercial resole BRL-1100 used in Example 1, and 514 grams of methanol were mixed to produce a solution having a solids content of approximately 55%. The pH of this solution was 4.85 and the viscosity 164 centipoises at 25° C. Upon further dilution of this solution with methanol to produce a solution of about 40% solids a solution having a viscosity of 40 centipoises at 25° C. was obtained.

The resins prepared in Examples 32 through 40 were employed in producing paper laminates. Impregnation of the paper was accomplished using the same procedures as were employed in Examples 11 through 18. None of the impregnated sheets was precured prior to pressing to effect final cure. Table 9 shows the conditions under which the impregnated sheets were laminated.

Table 9
PRESS CONDITIONS

| Ex. No. | Time, hour | Temperature, ° F. | Pressure, p.s.i. |
|---|---|---|---|
| 32 | 1 | 300 | 1,000 |
| 33 | 1 | 275 | 1,000 |
| 34 | 1 | 275 | 1,000 |
| 35 | 1 | 275 | 1,000 |
| 36 | 1 | 300 | 1,000 |
| 37 | 1 | 300 | 1,000 |
| 38 | 1 | 275 | 1,000 |
| 39 | 1 | 275 | 1,000 |
| 40 | 1 | 300 | 1,000 |

The laminates produced employing the resins formulated in Examples 32 through 40 and pressed according to the schedule in Table 9 were tested for flexural strength and water adsorption. The results of these tests are shown in Table 10.

Table 10
PHYSICAL PROPERTIES—PAPER LAMINATES

| Ex. No. | Laminate thickness, inches | Percent resin content | Water adsorption, percent | Flexural strength, p.s.i. |
|---|---|---|---|---|
| 32 | 0.118 | 28.8 | 1.9 | 23,707 |
| 33 | 0.113 | 28.6 | 1.4 | 26,958 |
| 34 | 0.113 | 28.6 | 1.6 | 27,735 |
| 35 | 0.114 | 28.6 | 1.3 | 25,670 |
| 36 | 0.117 | 28.6 | 1.9 | 23,269 |
| 37 | 0.116 | 28.8 | 1.6 | 21,915 |
| 38 | 0.114 | 28.9 | 1.2 | 26,384 |
| 39 | 0.114 | 28.4 | 1.9 | 26,990 |
| 40 | 0.115 | 28.6 | 1.6 | 25,004 |

EXAMPLE 41

A washed low ash lignin such as was employed in Example 40 was utilized in the production of paper and glass cloth laminates. This lignin after washing had an ash content of 0.174%. 2062 grams of this low ash free lignin (97% solids), 5952 grams of the commercial resole BLL-3526 employed in Example 4, and 1986 grams of methanol were mixed together to form a solution having a solids content of approximately 60%, a pH of 7.7 and a viscosity of 720 centipoises at 25° C. The lignin:resole ratio on a solids basis was 1:2. Prior to impregnation of the paper and glass cloth the resin solution was diluted to approximately 40% solids. The paper and the glass cloth were dipped in the resin and precured for 5 minutes at 200° F. and 5 minutes at 225° F. Following precuring, sheets were stacked and pressed at 1000 p.s.i. for one hour at 340° F. The glass cloth laminate thus produced exhibited a flexural strength of 106,400 p.s.i. and a flexural modulus of $5.26 \times 10^6$ at a resin content of 25.7%. The percent gain in weight upon soaking the laminate in water for 24 hours was only 0.15%. All of these properties, strength, stiffness and water resistance of this laminate are greatly superior to those that can be obtained utilizing any commercially available resole. The paper laminate produced exhibited a flexural strength of 23,200 p.s.i., a flexural modulus of $1.81 \times 10^6$ and a water absorption of 1.68% at a resin content of 35.2%. The glass cloth and the paper laminates were 0.12 and 0.25 inch in thickness respectively.

In ammonia catalyzed resoles the majority of the ammonia catalyst apparently reacts with the methylol phenols to form weakly basic substituted amines. For example, the resole BLL-3526 on Kjeldahl analysis contained 1.065% nitrogen, but if the resin was not digested with the usual acid prior to the alkali Kjeldahl distillation only 0.038% nitrogen was distilled. Whereas very little free ammonia is present in these ammonia catalyzed resoles the phenolic amines probably contribute to the apparent pH. It is likely that lignin exerts its beneficial results in ammonia resoles by tying up as salts any free ammonia or amines which are formed during the cure and which might act as alkaline catalysts during the polymerization. In any case it is very obvious that extremely beneficial properties are obtained with ammonia catalyzed resoles when free acid lignin is present and the pH of the resulting solution is above 7.

The following example illustrates the use of a lignin-containing resole solution as an adhesive in the formation of flakeboard.

EXAMPLE 42

A commercial resin commonly used in adhesive applications such as the manufacture of flakeboard was combined with lignin in the formulation of a 43% solids solution. The resole used was "Plyophen" P–398, manufactured by Reichhold Chemicals, Inc., as a 40% solids solution having a pH of 11.6 in what is believed to be water, the ash content being 10.8 and the viscosity at 25° C. being 186 centipoises. 200 grams of P–398 were combined with 40 grams of hardwood free lignin (100% solids) and the resultant mixture thoroughly agitated. 40 grams of water were added and upon mild heating a fluid solution was formed. The ratio of lignin to resole on a solids basis was 1:2. To 107 grams of this solution 14.0 grams of a 45% solids wax emulsion and 11 grams of water were added at a sprayer and the resultant mixture sprayed onto 605 grams (oven dry basis) of thin wood chips composed of approximately a 50:50 mixture of oak and aspen chips. The moisture content of these chips was approximately 1.5%. The wood chips and resin were blended together and felted to form a pad 5¾ inches thick. This felted pad was first subjected to a pre-press at 200 p.s.i. for 2 minutes, reducing the thickness of the pad to ¾ inch. This was followed by a press at 350° F. and 200 p.s.i. for 15 minutes resulting in a board ½ inch thick with a density of 41.8 pounds per cubic foot. Physical tests of this board gave the following results: Janka hardness, 1730 pounds; screw-holding power, face 305 pounds, edge 301 pounds; modulus of rupture 3960 pounds per square inch; and 24-hour water absorption, a weight increase of 69.8%, and a swell thickness of 15.9%.

EXAMPLE 43

The laminating varnish prepared in Example 4 was utilized in combination with alpha cellulose paper in producing a laminate having a resin content of 55.5% following the procedures for impregnation and lamination set forth in Table 1. This laminate was tested for electrical properties. The electrical properties obtained from this laminate are shown in Table 11 together with the standards for grade XX laminates established by the National Electrical Manufacturers' Association.

*Table 11*

ELECTRICAL PROPERTIES—PAPER LAMINATES

|  | Dissipation factor | Dielectric constant | Loss factor | Power factor |
| --- | --- | --- | --- | --- |
| NEMA: Standard | [1] 0.050 | [1] 6.00 | | |
| Laminate: Ex. 43 | 0.0466 | 5.89 | 0.278 | 0.0464 |

[1] Maximum.

Hereinabove this invention has been disclosed in connection with the conventional phenol-aldehyde resoles produced by reaction between phenol and formaldehyde in an aqueous medium. However, as illustrated in Examples 30 and 31, the resole need not necessarly be prepared from phenol and formaldehyde. Thus in addition to phenol other substances in the class of phenols may be used such as cresoles, xylenols, para-tertiary, butyl phenol, para-phenyl phenol, bis-phenols, and resorcinol and when reference is made to the employment of a phenol the reference includes compounds of the type mentioned, whereas specific reference to phenol is intended to apply to the particular substance which is commonly identified as phenol. In additional to formaldehyde other aldehydes may be used, such as chloral and benzaldehyde. More generally, any phenol or aldehyde may be employed which is reactive in the presence of an alkaline catalyst to produce an A stage resole adapted to be further cured through the B and C stages as these terms are commonly used in the art. Such resoles are characterized by the substitution of one or more methylol groups at the reactive positions on the molecule of a phenol. In a typical resole as such the methylol groups react with hydrogens in active positions on other molecules of a phenol and, as hereinabove stated, when lignin is present the methylol groups on the phenol molecule are believed to react with the alcoholic hydroxyls of the lignin. A typical resole does not consist of a single compound but generally is a mixture of different isomers and homologs. Thus, according to Sprengling and Freeman, Journal of the American Chemical Society, vol. 72, pp. 1982–1985 (1950), the reaction product of formaldehyde with phenol at a ratio of one part phenol to 1.4 parts formaldehyde using sodium hydroxide as a catalyst results in the following composition.

| Components of reaction product: | Mole percent present |
| --- | --- |
| Phenol | 5–10 |
| O-methylol phenol | 10–15 |
| P-methylol phenol | 35–40 |
| 2,4-dimethylol phenol | 30–35 |
| 2,4,6-trimethylol phenol | 4–8 |

When the ratio of formaldehyde to phenol is greater than 1.4:1 the proportion of 2,4,6-trimethylol phenol (which also may be indicated as 2,4,2'-trimethylol phenol) is increased; and in the presence of a substantial amount of free lignin it is preferable that the resole contain a major proportion of trimethylol phenol.

The resoles that are commercially produced differ in the degree of advancement while still in the A stage depending on the uses for which the resoles are intended. In the foregoing tabulation of components found in a typical resole, the components are in essentially unreacted state prior to polymerization but actually in most commercial resoles a certain amount of polymerization has already taken place, depending on the degree of advancement short of conversion of the resole from the A stage to the B stage. The resole in the initial or low stage of advancement is water soluble and becomes increasingly less soluble as advancement progresses. A resole in a low condition of advancement, as this term is used herein, refers to a resole which is soluble in a 60% solution of a 60:40 mixture of ethanol and water at 70° F. and at 0.2% alkali (NaOH). It is of distinct advantage, according to this invention, to utilize resoles in a low condition of advancement inasmuch as a higher order of properties is obtainable in the cured resin produced by dissolving free lignin in the resole. However, as has been disclosed hereinabove, even more advanced resoles, which require a relatively high concentration of alkali to hold them in solution, are benefited by bringing free lignin into mutual solution therewith with attendant lowering of the pH of the resole.

Another reason for utilizing the low advanced resole is that such resoles contain less alkali for holding the resole in solution. While the pH of the resole may be lowered by incorporation of free lignin, nevertheless the catalyst when provided by a non-volatile substance such as an alkali metal or an alkaline earth metal remains during curing and detracts from the properties of the cured resin both from the point of view of resistance to water absorption and electrical properties. It is preferable, according to this invention, that the mixture of free lignin dissolved therein contain not more than about 2% of ash and it is preferable that the ash be substantially less than 1%. From the point of view of the alkaline reactive metal, it is preferable that the alkaline reactive metal be not greater than 1% by weight of the solids comprised in the cured resin.

As has been disclosed hereinabove, when free lignin is dissolved in a resole there is some transfer of the alkali used for catalyzing the production of the resole to the acidic functions of the lignin. Consequently in the mutual solution at least some of the lignin may have been converted to the salt form and for low additions of free lignin it is possible that the lignin in its entirety may be transformed to the salt form. Consequently, when reference is made herein to dissolving free lignin in a resole or in a solution of resole in a volatile solvent or to free lignin being in solution with a resole it is to be understood that the reference is to the addition of free lignin to the solution inasmuch as the ultimate disposition of the alkaline catalyst is a matter of considerable complexity. However, for the reasons mentioned hereinabove, the addition of free lignin even though converted to the salt form serves to alter the catalytic effect of the alkali on the components of the resole so that the reactions during curing result in an improved high order of properties, it being critical to optimum attainment of the high order of properties that the solution to which the free lignin has been added be a pH not greater than 7 and preferably substantially less than 7. Moreover, as hereinabove disclosed, it is a feature of this invention that a lowering of the pH may be accomplished even though the resole containing free lignin therein is substantially free of any mineral acid addition. These effects are to be contrasted with the addition of lignin in its alkali salt form to an A stage resole, for in such case the acid functions of the lignin are already satisfied by reaction with alkali and are in the salt form, and there is no effectiveness in any of the respects mentioned above, namely, stabilization of the resole, lowering of the pH of the resole, attainment of pH values in the range from 3 to 7 or transfer of the catalyst alkali to the lignin so that the polymerization reaction and the reaction of the resole with the lignin may occur with reduced influence of the alkali on the reactions. Moreover, the additional alkali in very substantial amount severely impairs resistance to water absorption and electrical properties.

With regard to the relative proportions of lignin and resole, the advantages of this invention begin to be realized whenever free lignin is dissolved in an A stage resole with attendant substantial lowering of the pH of the resole. Thus, while the ratio of lignin to resole on a solids basis may be as low as 1:10, the effect of the lignin is considerably less extensive than when a greater quantity of lignin is used to contribute to the high properties of the cured resin. It is ordinary practice to employ the free lignin in a ratio of at least 1 part of lignin to 2 parts of resole on a solids basis. Generally the lignin:resole ratio is not greater than 5:1, although an even greater ratio may be utilized while still obtaining desirable resin reaction products.

The resoles containing dissolved free lignin produced according to this invention may be cured at usual curing temperatures for a resole, such temperatures usually being not greater than about 350° F. in order to minimize degradation of the resin. However, it is one of the advantageous features of this invention that curing may be effected at a relatively low order of temperatures in the range from about 250° F. to about 350° F. Curing temperatures in this range have been found to produce excellent results in the production of laminates having a high order of properties. While such temperatures promote curing at a rate consistent with volume production of cured products, curing may occur more gradually at lower temperatures and curing includes such more gradual resin-forming reactions.

When reference is made herein to a solution of free lignin in a resole, the solution may be either in the presence of or in the absence of a volatile solvent medium, unless there is specific reference to the employment of a volatile solvent medium. While the free lignin which is employed in the practice of this invention ordinarily is an alkali lignin of the character hereinabove described, it likewise is possible in the practice of this invention to employ as free lignin a free lignin which has been modified but with retention in a substantial degree of the reactive groups which characterize the free lignin molecular structure. Thus, lignin may be modified by reaction with a compound to form either an ester or an ether so long as such treatment does not exhaust the reactive hydroxyl groups of the lignin molecule or the acid groups for reaction with the alkali catalyst. To the extent that such non-reactive radicals are added, the reactivity of the lignin on becoming chemically linked with the resole or resole components becomes diminished. Nevertheless, formation of such esters or ethers usually modifies the viscosity characteristics of the lignin and where such modification is desired a free lignin modified in the respects mentioned may be employed.

As hereinabove stated, the methoxy group content of the lignin is relatively inert and does not appear to enter into the resin-forming reaction of the resole and, this being the case, the methoxy radical content of the lignin is largely immaterial. However, it is possible to wholly or partially remove methoxy groups from the lignin molecule with complete or partial replacement of correspondingly positioned hydroxyls and to employ free lignin thus demethylated in the practice of this invention.

While other types of lignin such as sulfite lignin and lignin obtained by acid hydrolysis are not satisfactory in the practice of this invention, chemical modifications of such lignin to produce lignins having chemical characteristics similar to free alkali lignin would permit the use of such lignins in the production of resins according to this invention.

In commercial use of resole the ultimate user usually obtains the resole in the A stage and such resole and solutions thereof in a volatile solvent medium constitute commercial products. Accordingly, this invention relates not only to the production of the cured resin, but also to the products made and sold wherein the resole component is still in the A stage and free lignin in intimate combination either dissolved in a volatile solvent or in the solid state. While such intimate combination ordinarily is effected in the practice of this invention by producing a mutual solution, it need not necessarily be the case that in the solid state the free lignin and the A stage resole be or remain in true solution so long as they are in such intimate association that the free lignin is reactive with the A stage resole during curing as has been described and exemplified hereinabove.

While this invention has been described in connection with various examples and specific ways of practicing this invention, it is to be understood that this has been done for purposes of illustration and that the practice of this invention may be varied within the scope of the principles employed in the practice thereof as hereinabove set forth.

We claim:

1. A method of producing a resin which comprises dissolving alkali lignin in the free acid form in a solution of an alkaline catalyzed A stage resole in a volatile solvent, which solvent consists essentially of a solvent selected from the group consisting of methanol, ethanol, propanols, water and mixtures of said solvents with each other, to form a mutual solution at a pH between about 3 and about 7 which is substantially lower than that of said solution of said resole in the absence of said lignin, the ratio by weight of said lignin to said resole being from about 1:10 to about 5:1, separating the volatile solvent from the solids in said mutual solution and curing the residue.

2. In a method of making a composition for producing a resin, the step of dissolving solid alkali lignin in the free acid form in a solution of an alkaline catalyzed A stage resole in a volatile solvent medium consisting essentially of a solvent selected from the group consisting of water, methanol, ethanol, propanols and mixtures of said solvents with each other to form a mutual solution of said lignin and said A stage resole having a pH between about 3 and about 7 wherein the ratio by weight of said lignin to said resole is from about 1:10 to about 5:1.

3. In a method of making a composition for producing a resin, the step of adding to an aqueous solution of an alkaline catalyzed A stage resole alkali lignin in the free acid form and a solvent selected from the group consisting of water, methanol, ethanol, propanols and mixtures of said solvents with each other to form a mutual solution of said resole and said alkali lignin in free acid form wherein the ratio by weight of said lignin to said resole is from about 1:10 to about 5:1, said solution containing a lesser ratio of the solvent of the mixture to the total solids than prior to the addition of said lignin and having a pH between about 3 and about 7.

4. A resin-forming composition which comprises alkali lignin in the free acid form dissolved with a preformed alkaline catalyzed A stage resole in a volatile solvent medium consisting essentially of a solvent selected from the group consisting of water, methanol, ethanol, propanols and mixtures of said solvents with each other forming a mutual solution having a pH of from about 3 to about 7, said solvent constituting from about 25% to about 70% by weight of said composition, and the ratio of said lignin to said resole being from about 1:10 to about 5:1.

5. A composition according to claim 4 wherein said resole is a resole catalyzed by an alkaline reactive metal and wherein said composition contains less than 1% by weight of alkaline-reactive metal.

6. A resin-forming composition which comprises alkali lignin with the free acid form dissolved with a preformed alkaline catalyzed A stage resole catalyzed by ammonia in a volatile solvent medium consisting essentially of a solvent selected from the group consisting of water, methanol, ethanol, propanols and mixtures of said solvents with each other and forming a mutual solution therewith wherein said alkali lignin in the free acid form is at least the molar equivalent of the alkaline-reactive cation contained in said ammonia alkaline catalyzed resole and is not greater than five parts by weight of said lignin per part by weight of said resole.

7. A resin-forming composition which comprises alkali lignin in the free acid form dissolved in a volatile solvent medium containing dissolved therein preformed alkaline catalyzed A stage resole and forming therewith a mutual solution of said lignin and said resole in said volatile solvent medium at a pH between about 3 and about 7, the ratio by weight of said lignin to said resole being from about 1:10 to about 5:1 and said volatile solvent medium consisting essentially of a solvent selected from the group consisting of water, methanol, ethanol, propanols and mixtures of said solvents with each other.

8. A method of producing a resin which comprises dissolving alkali lignin in the free acid form in a solution of an alkaline catalyzed A stage resole in a volatile solvent, which solvent consists essentially of a solvent selected from the group consisting of methanol, ethanol, propanols, water and mixtures of said solvents with each other, to form a mutual solution at a pH between about 3 and about 7 which is substantially lower than that of said solution of said resole in the absence of said lignin, the ratio by weight of said lignin to said resole being from about 1:10 to about 5:1, and separating the volatile solvent from the solids in said mutual solution.

9. A resin-forming composition which is the product of claim 8.

10. A resin-forming composition according to claim 9 in finely-divided particulate form.

References Cited by the Examiner
UNITED STATES PATENTS

| | | | |
|---|---|---|---|
| 2,068,926 | 1/37 | Nevin | 260—17.5 |
| 2,282,518 | 5/42 | Hochwalt et al. | 260—17.5 |
| 2,571,986 | 10/51 | Hallonquist | 260—17.5 |
| 2,629,703 | 2/53 | Vogelsang | 260—17.5 |
| 2,786,008 | 3/57 | Herschler | 260—17.5 |
| 2,786,820 | 3/57 | Uschmann | 260—17.5 |

JOSEPH L. SCHOFER, *Primary Examiner.*

D. ARNOLD, A. M. BOLTTCHER, MILTON STERMAN, LEON J. BERCOVITZ, JAMES A. SEIDLECK,
*Examiners.*